United States Patent
Jüstel et al.

(10) Patent No.: US 7,298,077 B2
(45) Date of Patent: Nov. 20, 2007

(54) DEVICE FOR GENERATING UV RADIATION

(75) Inventors: Thomas Jüstel, Aachen (DE); Heinrich Von Busch, Aachen (DE); Gero Heusler, Aachen (DE); Walter Mayr, Alsdorf (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 365 days.

(21) Appl. No.: 10/506,288

(22) PCT Filed: Feb. 26, 2003

(86) PCT No.: PCT/IB03/00711

§ 371 (c)(1),
(2), (4) Date: Aug. 31, 2004

(87) PCT Pub. No.: WO03/075314

(65) Prior Publication Data
PCT Pub. Date: Sep. 12, 2003
US 2005/0168124 A1 Aug. 4, 2005

(30) Foreign Application Priority Data

Mar. 4, 2002 (DE) .............................. 102 09 191

(51) Int. Cl.
*H01J 1/62* (2006.01)
*H01J 61/44* (2006.01)

(52) U.S. Cl. ............... 313/486; 313/467; 313/487; 313/491; 252/301.4 P; 252/301.4 R

(58) Field of Classification Search ............. 313/486
See application file for complete search history.

(56) References Cited

U.S. PATENT DOCUMENTS

| 3,980,887 | A | * | 9/1976 | Mattis et al. ............ 250/483.1 |
| 4,499,159 | A | * | 2/1985 | Brines et al. ............. 428/691 |
| 4,983,881 | A | * | 1/1991 | Eliasson et al. ........... 313/607 |
| 5,998,047 | A | * | 12/1999 | Bechtel et al. ............. 428/690 |
| 6,193,894 | B1 | * | 2/2001 | Hollander .................. 210/748 |
| 6,398,970 | B1 | * | 6/2002 | Justel et al. ................ 210/748 |
| 6,822,385 | B2 | * | 11/2004 | Oskam et al. ............. 313/486 |
| 2002/0195922 | A1 | * | 12/2002 | Juestel et al. ............. 313/486 |

FOREIGN PATENT DOCUMENTS

| EP | 1048620 | 11/2000 |
| EP | 1541659 A1 * | 6/2005 |

* cited by examiner

*Primary Examiner*—Sikha Roy

(57) ABSTRACT

A device for generating ultraviolet radiation by an excimer discharge is equipped with an at least partly UV-transparent discharge vessel whose discharge space is filled with a gas filling. The device includes electrodes for triggering and maintaining the excimer discharge in the discharge space. The device further has a coating that contains a phosphor including a host lattice and neodymium(III) as an activator.

15 Claims, 9 Drawing Sheets

DEVICE FOR GENERATING UV RADIATION

The invention relates to a device for generating electromagnetic radiation, which device is equipped with an at least partly transparent discharge vessel whose discharge space is filled with a gas filling, with means for triggering and maintaining an excimer discharge in the discharge space, and with a coating that contains a phosphor.

Radiation sources of this kind are suitable, depending on the spectrum of the radiation emitted, for general and auxiliary lighting, e.g. domestic and office lighting, for the back-lighting of displays, e.g. liquid crystal displays, for traffic lights and signal lighting, and for photochemical processes, e.g. sterilization and photolysis.

The devices concerned are in particular ones of the kind known from EP 1048 620 for the disinfection of water.

A disadvantage of the devices described in EP 1048 620 is that the optical efficiency achieved is low for photolytic applications.

In photolytic processes, radiation having a very high photon energy is absorbed by certain organic molecules, and the chemical C—C and C—O bonds, for example, in the molecules are severed. Photolytic processes are used for example to produce very pure water, for the dry cleaning of surfaces, for the curing of polymers, and similar applications.

It is an object of the present invention to provide a device for generating ultraviolet radiation that is ideally suited to photolytic processes.

In accordance with the invention, this object is achieved by a device for generating ultraviolet radiation by means of an excimer discharge, which device is equipped with an at least partly UV-transparent discharge vessel whose discharge space is filled with a gas filling, with means for triggering and maintaining an excimer discharge in the discharge space, and with a coating that contains a phosphor comprising a host lattice and neodymium(III) as an activator.

A device of this kind converts the primary radiation generated by the excimer discharge into radiation having a maximum emission at a wavelength of between 180 and 250 nm. Radiation in this wavelength range has a high photon energy and breaks even strong chemical bonds such as single C—C or C—O bonds. It is, therefore, suitable for use in photolytic processes such as are used for producing very pure water, in the dry cleaning of surfaces, the curing of polymers and similar applications.

Hence, the maximum emission lies in the range between 180 and 250 nm that encourages photolytic reactions, and has a high depth of penetration into water and other solvents.

In one embodiment of the invention, the phosphor contains praseodymium(III) as a co-activator.

It is preferred for the phosphor to be selected from the group $(La_{1-x}Y_x)PO_4:Nd$ where $0 \leq x \leq 1$, $(La_{1-x}Y_x)PO_4:Nd,Pr$ where $0 \leq x \leq 1$, $SrAl_{12}O_{19}:Nd$, $LaBO_3O_6:Nd$, $LaMgB_5O_{10}:Nd$, $SrAl_{12}O_{19}:Nd,Pr$, $LaBO_3O_6:Nd,Pr$, $LaMgB_5O_{10}:Nd,Pr$ and $GdPO_4:Nd$.

It may also be preferred for the phosphor to comprise a coating that contains an oxide selected from the group MgO, $SiO_2$ and $Al_2O_3$.

In one embodiment of the invention, the gas filling contains a gas selected from the group xenon, krypton, argon, neon and helium.

It is particularly preferred for the gas filling to contain xenon. A xenon-excimer discharge shows particularly efficient VUV generation with a maximum at 172±3.5 nm, more than 80% of which is converted by the Nd(III)-activated phosphors.

The electrodes may be composed of a metal or alloy that reflects UV-C light.

Part of the discharge vessel may be provided with a coating that acts as a reflector of VUV and UV-C light.

The invention also relates to the use of the device for photolytic processes.

These and other aspects of the invention are apparent from and will be elucidated with reference to the embodiments described hereinafter.

In the Drawings

The device according to the invention for generating ultraviolet radiation by means of an excimer discharge is equipped with an at least partly UV-transparent discharge vessel whose discharge space is filled with a gas filling, and with a coating that comprises a phosphor that contains a host lattice and neodymium(III) as an activator. The device is also equipped with means for triggering and maintaining the excimer discharge.

There are a wide variety of possible designs for the discharge vessel such as plates, single tubes, co-axial tubes, and discharge tubes that are straight, U-shaped, curved or coiled in a circle, cylindrical or of other shapes. A typical design for a device for photolytic reactions is that shown in FIGS. 1 and 2. As means for triggering and maintaining the excimer discharge, this design comprises amongst other things electrodes of first and second types. A coiled wire is inserted in the gas-discharge vessel 100 concentrically thereto. This wire forms the first, inner electrode 301 of the device. The outside of the glass is covered with a small-mesh wire mesh that forms the second, outer electrode 302. The discharge vessel is sealed with a gas-tight seal. The space within it is filled with xenon or a gas containing xenon. The two electrodes are connected to the two poles of an a.c. power source. The electrode geometry, together with the pressure in the discharge vessel and the composition of the gas, is matched to the characteristics of the a.c. power source.

Figure 3:
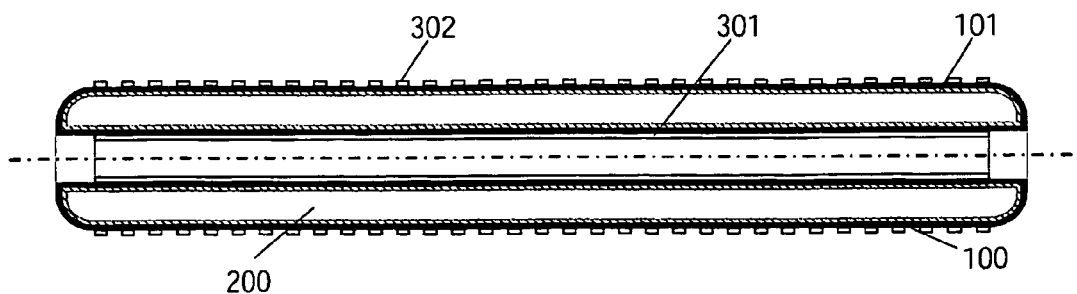
FIG. 3 shows a second design of device for generating ultraviolet radiation, of the co-axial type.
Figure 4:
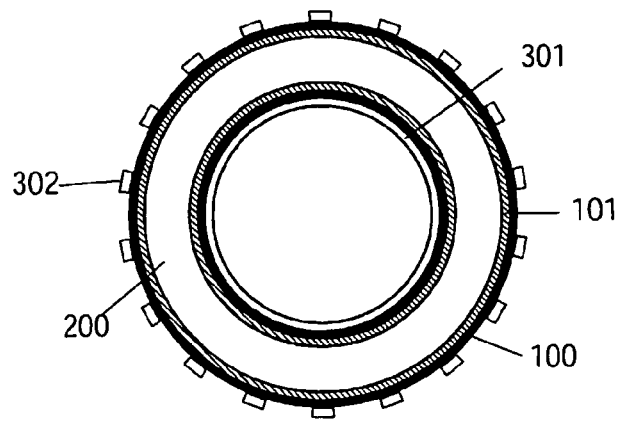
FIG. 4 shows a second design of device for generating ultraviolet radiation, of the co-axial type, in cross-section.

Another typical design for photolytic reactions is the co-axial design through which water or a flow of air flows centrally, which is shown in FIGS. 3 and 4. The discharge vessel 100 comprises two co-axial bodies made of glass that are connected together in a gas-tight manner to form a hollow sleeve. The annular gap between the two co-axial bodies of glass forms the discharge space 200 and is filled with xenon or a gas containing xenon. The fluid medium to be treated may flow through the inner tube, to the inner wall of which a transparent electrode 301 of the first kind is applied. The medium to be treated may also be situated outside the outer tube. The outside of the glass is covered with a small-mesh wire mesh that forms the second, outer electrode 302. The power supply is provided by an a.c. power source connected to these two electrodes.

Figure 5:
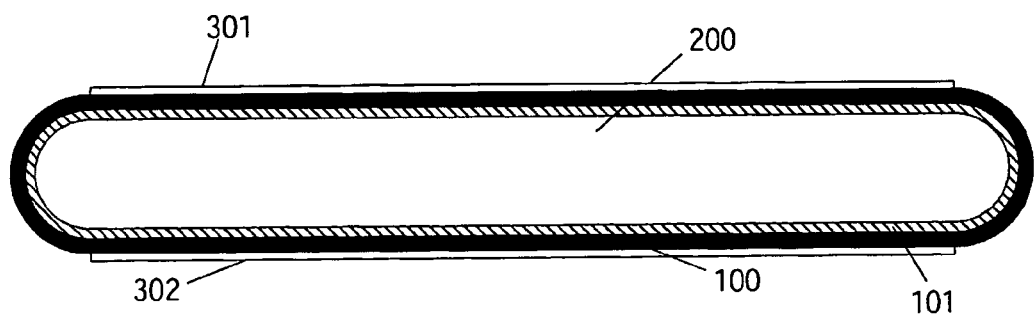
FIG. 5 shows a third design of device for generating ultraviolet radiation, of the tubular type.
Figure 6:
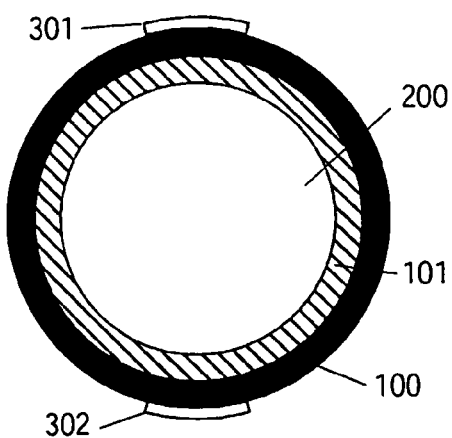
FIG. 6 shows a third design of device for generating ultraviolet radiation, of the tubular type, in cross-section.

Another typical and easily produced design is shown in FIGS. 5 and 6.

Figure 13:
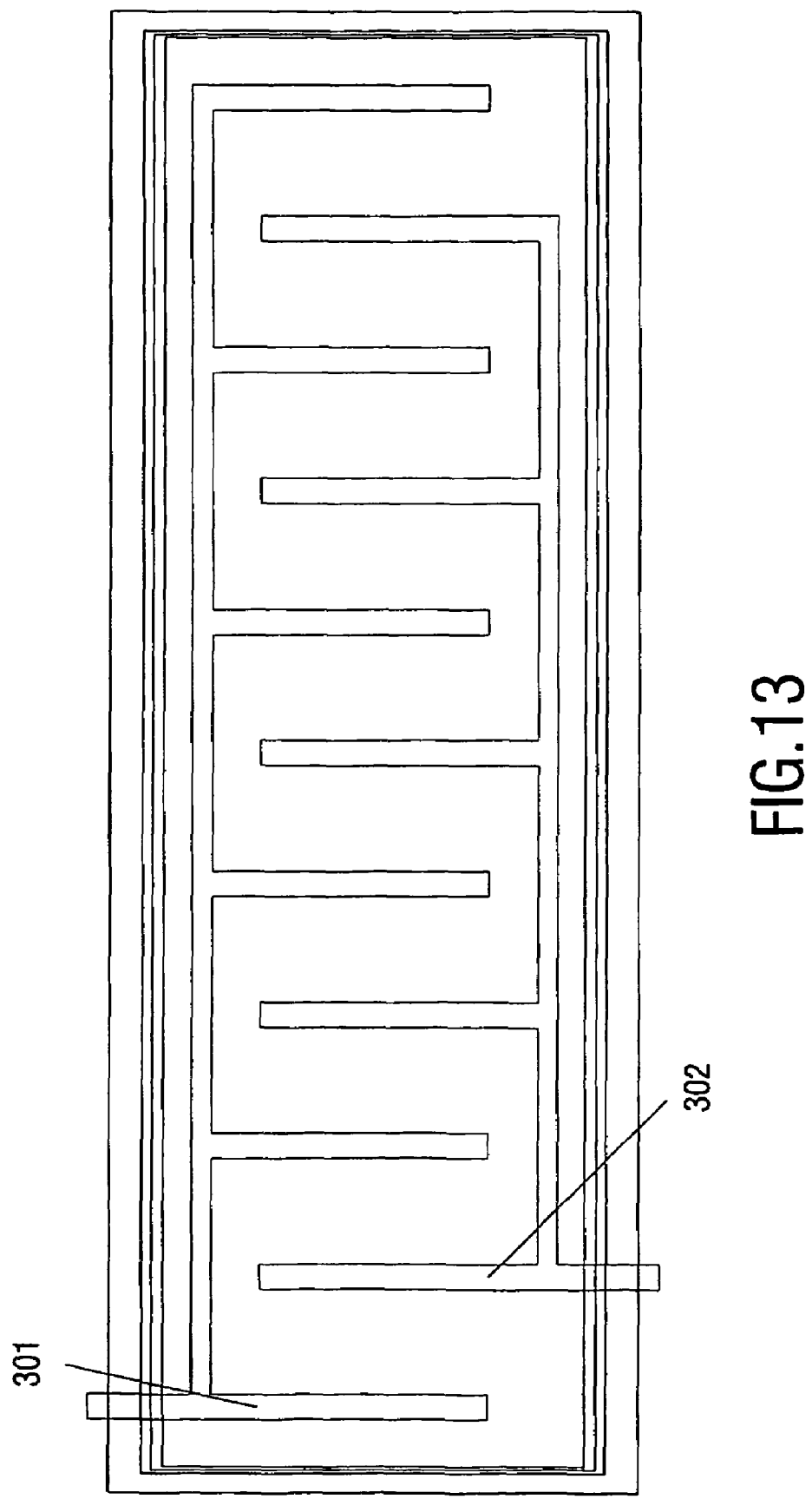
FIG. 13 shows a seventh design of device for generating ultraviolet radiation, in the form of a flat lamp.
Figure 14:
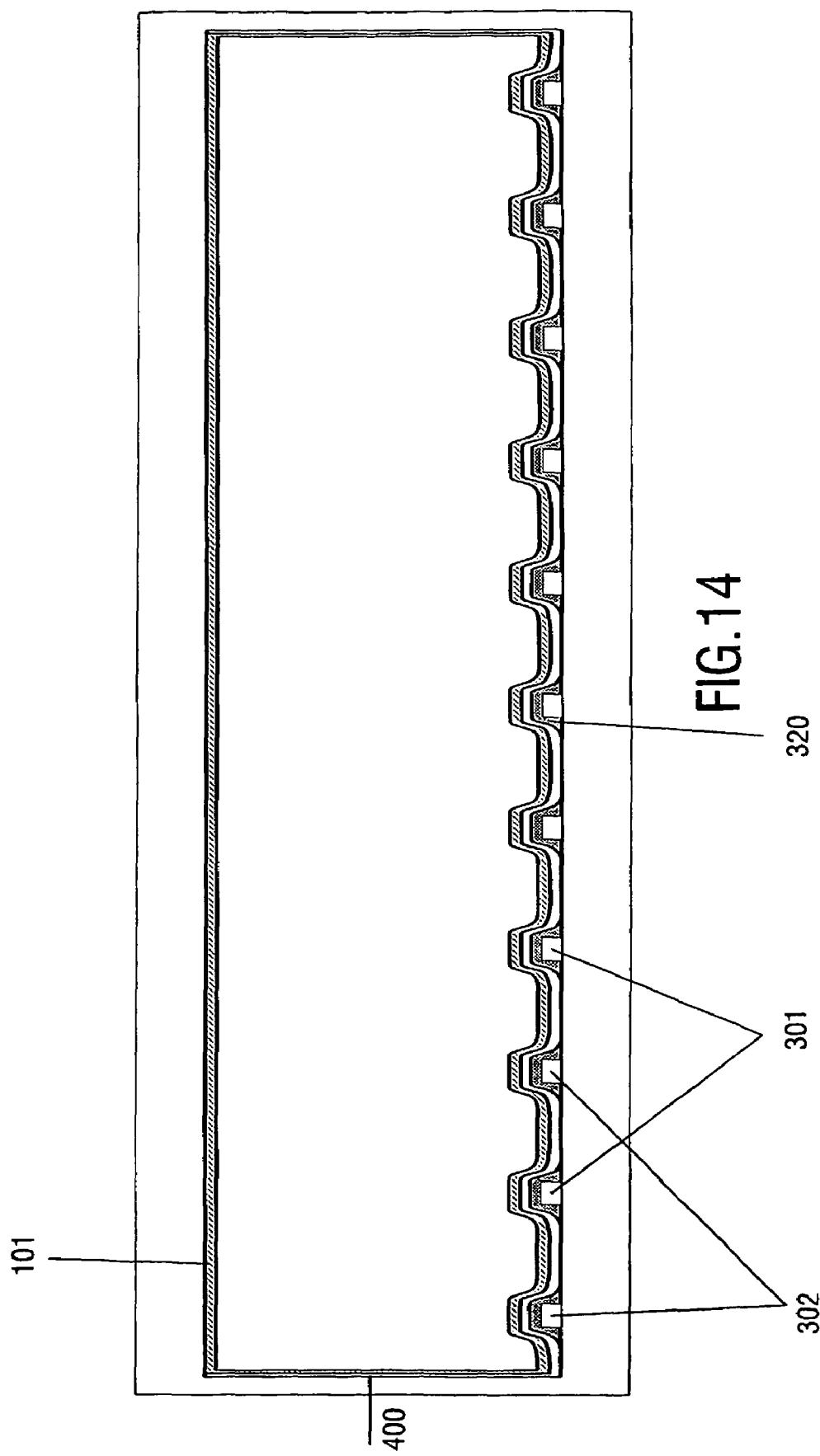
FIG. 14 shows a seventh design of device for generating ultraviolet radiation, in the form of a flat lamp, in cross-section.

The flat design shown in FIGS. 13 and 14 (a "flat lamp") is particularly suitable for the dry cleaning of surfaces and for curing paint finishes.

Figure 7:
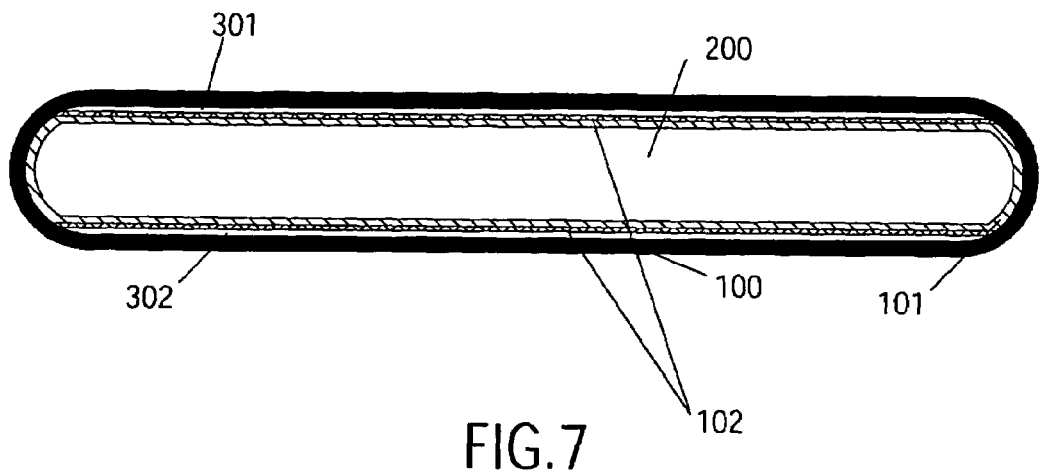
FIG. 7 shows a fourth design of device for generating ultraviolet radiation, having buried electrodes.
Figure 8:
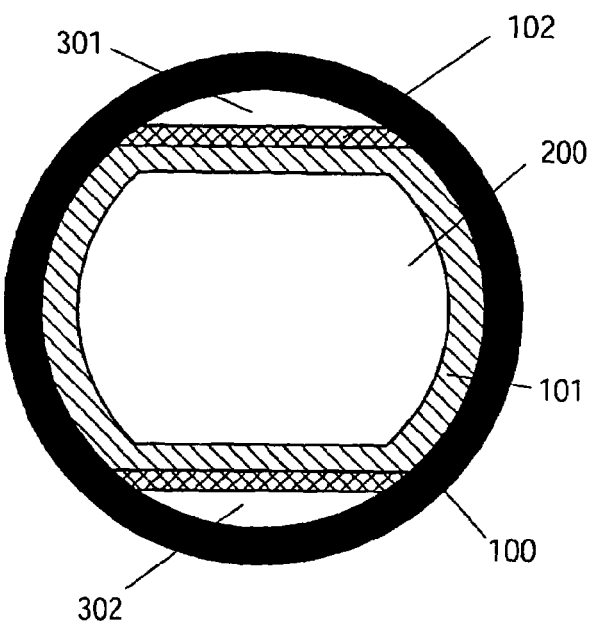
FIG. 8 shows a fourth design of device for generating ultraviolet radiation, having buried electrodes, in cross-section.

In the design shown in FIGS. 7 and 8 the electrodes are mounted on the inside of the wall of the gas-discharge vessel and are separated from the gas discharge space 200 by a covering layer 102 of a dielectric material. This dielectric covering layer 102 preferably comprises glass solder.

The material used for the discharge vessel is preferably quartz or types of glass that are permeable to UV-C and VUV radiation.

The means of triggering and maintaining an excimer discharge comprise electrodes of first and second kinds. In a preferred design, electrodes of the first and second kinds are arranged on the wall of the discharge vessel to generate a dielectrically inhibited discharge, with at least one electrode being separated from the discharge space by a dielectric material. In designs in which at least one electrode is separated from the discharge space by a dielectric barrier, a silent electric discharge is triggered in the filling gas when a suitable a.c. voltage is applied.

Figure 11:
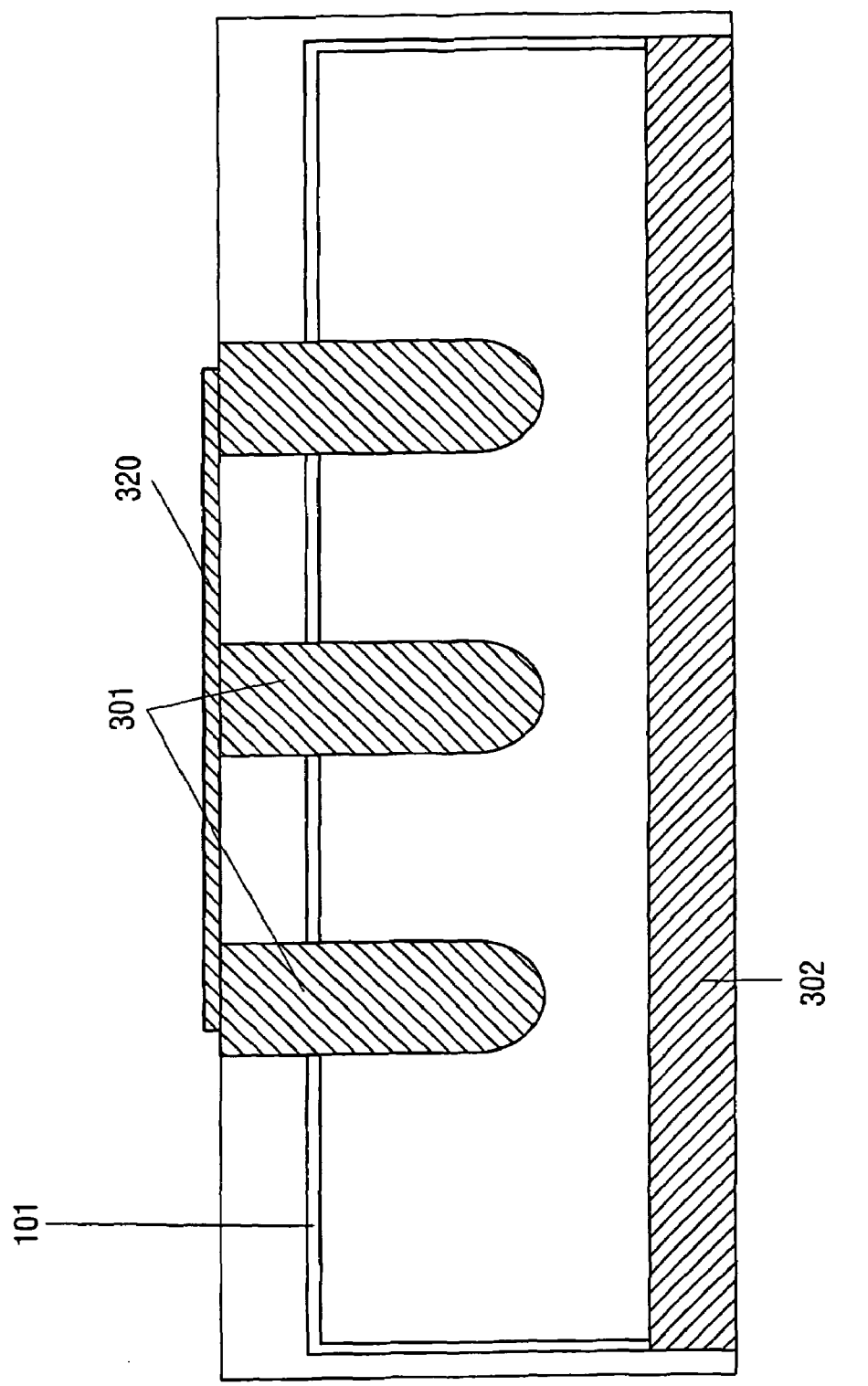
FIG. 11 shows a sixth design of device for generating ultraviolet radiation, employing corona discharge, in cross-section.
Figure 12:
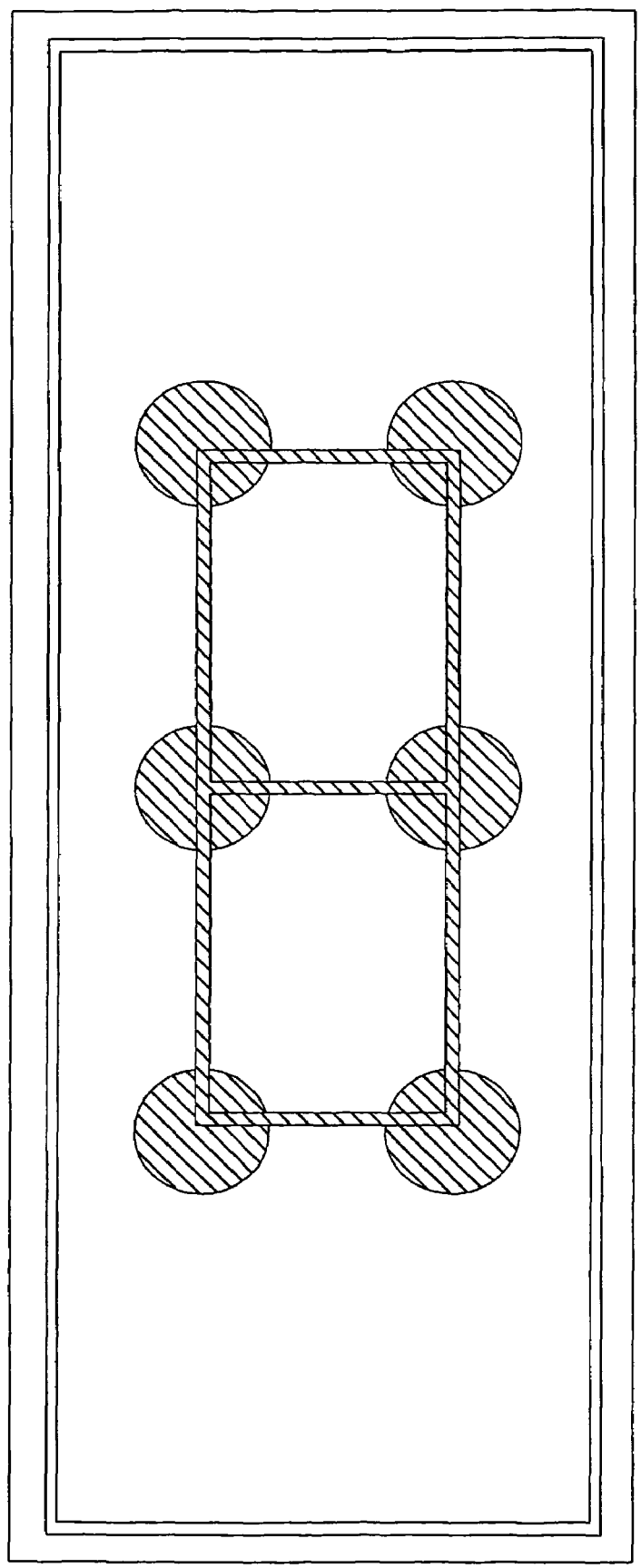
FIG. 12 shows a sixth design of device for generating ultraviolet radiation, employing corona discharge, in plan.

In the designs shown in FIGS. 11 and 12, a discharge of the corona type is triggered in the filling gas when a suitable d.c. or a.c. voltage is applied to the electrodes. In designs that are suitable for a discharge of the corona type, it is not necessary for the electrodes of the first and second types to be separated from the filling gas by a layer of a dielectric material.

In the case of both the silent electrical discharge and the corona discharge, a plasma that contains excimers, i.e. molecules that are only stable in the excited state, forms if there is a suitable gas filling and irrespective of the gas pressure and the electrode geometry.

The electrodes are composed of a metal, e.g. aluminum or silver, a metal alloy, or a transparent conductive inorganic compound, e.g. ITO. They may take the form of a coating, a bonded-on foil, strips of bonded-on foil, a wire or a wire mesh.

It is also possible for a transparent electrolyte, e.g. water, to be used as one of the electrodes. This is particularly advantageous for photolytic processes in water because the radiation is generated in this way in the immediate vicinity of the medium to be irradiated.

In another preferred embodiment, electrodes of first and second kinds are arranged on the wall of the discharge vessel to generate a corona discharge.

Figure 9:
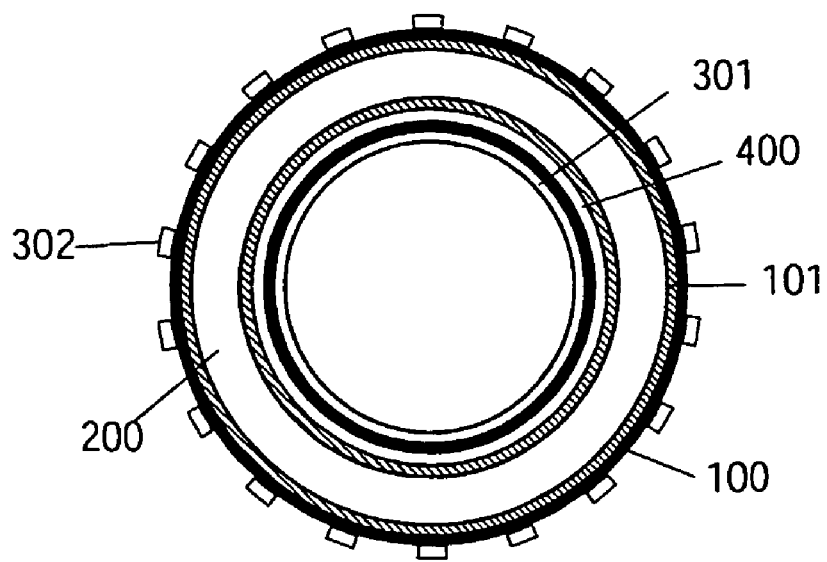
FIG. 9 shows a fifth design of device for generating ultraviolet radiation, having UV reflectors.
Figure 10:
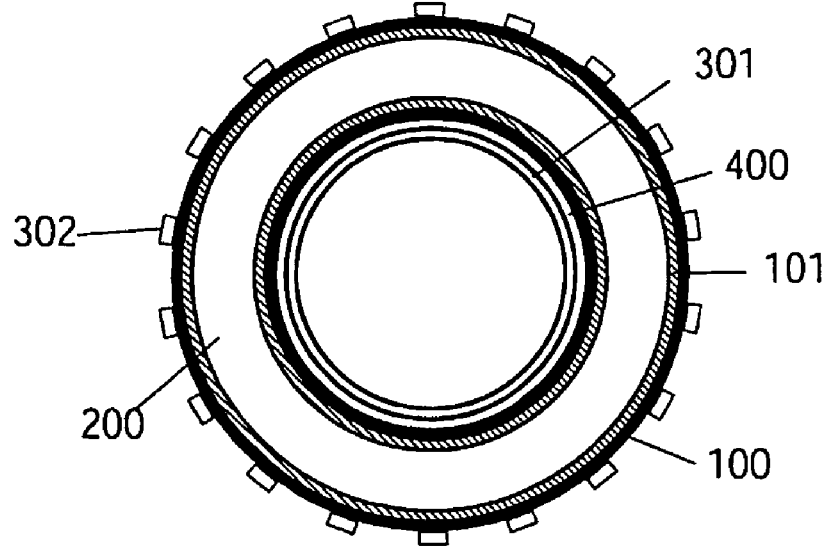
FIG. 10 shows a fifth design of device for generating ultraviolet radiation, having UV reflectors, in cross-section.

To focus the light intensity in a given direction, part of the discharge vessel may be provided with a coating that acts as a reflector 400 of VUV and UV-C light. UV reflectors are preferably used for designs as shown in FIG. 9 or 10 in order to increase the inward or outward radiation by means of a surface.

Metal surfaces, which are provided with a protective layer transparent to UV where required, are suitable for use as reflectors of radiation in the UV-C or VUV range. An aluminum foil coated with magnesium fluoride is suitable, for example.

Another suitable form of coating that acts as a reflector is a coating that contains particles of a material selected from the group MgO, $SiO_2$, $Al_2O_3$, $(La_{1-x}Y_x)PO_4$ where $0 \leq x \leq 1$, $(La_{1-x}Y_x)PO_4$ where $0 \leq x \leq 1$, $SrAl_2O_{19}$, $LaB_3O_6$, $LaMgB_5O_{10}$, $SrAl_{12}O_{19}$, $LaBO_3O_6$, $LaMgB_5O_{10}$ and $GdPO_4$.

There are also certain designs for the electrodes of the first and second types that are of large area and are composed of a metallic material and that act as reflectors of UV-C and VUV radiation. A design of this kind is shown by way of example in FIG. 11.

The discharge vessel is preferably filled with oxygen-free xenon or a mixture of gases that contains xenon, because there is a substantial concentration of the electron energy distribution of an excimer discharge in a xenon-containing atmosphere in the region of the first Xe excitation energy at 8.4 eV and this distribution is thus ideally matched to the formation of $Xe_2$ excimers and, as a result of the emission of the latter in the wavelength range between 160 and 190 nm, to the excitation of neodymium-containing phosphors.

The inner wall of the discharge vessel is wholly or partly covered with a coating 101 that contains the phosphor. The coating may also contain an organic or inorganic binder or binder composition. Furthermore, the phosphor layer may be protected against attack by the discharge by means of a protective layer.

The phosphor comprises a host lattice that is doped with a few percent of an activator. The $Nd^{3+}$-activated phosphors that are used in accordance with the invention are principally phosphors having a host lattice that exerts a weak ligand field. What are particularly suitable are inorganic, oxygen-containing host lattices composed of oxides, aluminates, gallates, phosphates, borates or silicates. A high co-ordination number in these host lattices also reduces the crystal-field splitting of the neodymium d-orbitals that play a part in the optical transitions. Hence, at 43000 $cm^{-1}$, the 4f5d level of neodymium that emits VUV and UV-C radiation is so far above the ground state that non-radiating relaxation is avoided by means of excited 4f4f states. Hence, these $Nd^{3+}$-activated phosphors, and particularly the phosphors that are selected from the group $(La_{1-x}Y_x)PO_4$:Nd where $0 \leq x \leq 1$, $(La_{1-x}Y_x)PO_4$:Nd,Pr where $0 \leq x \leq 1$, $SrAl_{12}O_{19}$:Nd, $LaBO_3O_6$:Nd, $LaMgB_5O_{10}$:Nd, $SrAl_{12}O_{19}$:Nd,Pr, $LaB_3O_6$:Nd,Pr, $LaMgB_5O_{10}$:Nd,Pr and $GdPO_4$:Nd, are particularly efficient phosphors under vacuum UV excitation.

As an activator, the $Nd^{3+}$ ion generally shows wide absorption bands in the ultraviolet, sometimes extending into the blue, in the various host lattices. The emission bands of the phosphors according to the invention are situated in the range from the deep ultraviolet to the yellow-orange, with an emission maximum at a wavelength between 180 and 250 nm, i.e. in the UV-C and VUV range. The extinction temperature of these phosphors is above 100° C.

What may also be particularly preferred are phosphors that contain praseodymium, such as $(La_{1-x}Y_x)PO_4$:Nd,Pr where $0 \leq x \leq 1$, $SrAl_{12}O_{19}$:Nd,Pr, $LaB_3O_6$:Nd,Pr and $LaMgB_5O_{10}$:Nd,Pr, for example.

If an a.c. voltage is applied to the electrodes, a silent electrical discharge is triggered in the filling gas, which is preferably xenon-containing. As a result, xenon excimers, i.e. molecules that are only stable in the excited state, form in the plasma. $Xe + Xe^* = We_2^*$.

The excitation energy is emitted again as UV radiation at a wavelength of $\lambda = 140$ to 190 nm. This conversion of electron energy into UV radiation is performed with great efficiency. The UV photons generated are absorbed by the phosphors and the excitation energy is emitted again partly in the longer wavelength range of the spectrum. The absorption co-efficient of the phosphors activated with $Nd^{3+}$ or with $Nd^{3+}$ and $Pr^{3+}$ is particularly high for wavelengths in the xenon-radiation range and the quantum yield is high. The host lattice affects the exact position of the energy level of the activator ion and hence the emission spectrum.

The phosphors are produced by a solid-state reaction from the starting compounds, in the form of fine-grained powders having a grain-size distribution of between 1 and 10 µm. They are applied to the walls of the discharge vessel by a flow coating process. The coating suspensions for the flow coating process contain water or an organic compound such as butyl acetate as a solvent. The suspension is stabilized, and its rheological properties acted on, by adding aids such as stabilizers, liquefiers and cellulose derivatives. The phosphor suspension is applied to the walls of the vessel as a thin film, dried and fired on at 600° C. The vessel is then evacuated to remove all gaseous contaminants and particularly oxygen. The vessel is then filled with xenon at a pressure of approximately 200 to 300 mbar and sealed.

The devices described are highly suitable for high-yield photolytic reactors. Because the spectrum of the radiation emitted is confined to a narrow band, the device according to the invention may advantageously be employed to carry out wavelength-selective photoreactions.

Table 1 shows the absorption edges of certain widely used solvents

TABLE 1

| Solvent | Absorption edge [nm] |
| --- | --- |
| Isopropyl alcohol | 210 |
| Cyclohexane | 210 |
| Methyl cyclohexane | 210 |
| Ethanol | 210 |
| Methanol | 210 |
| Acetonitrile | 210 |
| 2,2,4-trimethyl pentane | 220 |
| Iso-octane | 220 |
| Hexane | 220 |
| Dioxane | 220 |
| Glycerol | 230 |
| Dichloromethane | 235 |
| 1,2-dichloroethane | 240 |
| Chloroform | 250 |

Industrial photochemical processes (e.g. photo-chlorination, photo-bromination, photo-sulfochlorination) can also be carried out more efficiently with the device according to the invention.

Further uses for the device according to the invention have to do with water and waste water technology where polluted water is the fluid to be treated. Examples of treatment of this kind that may be mentioned are a) disinfection b) breakdown of pollutants and dyes and removal of odor.

The device according to the invention may also be used for sterilizing other liquids and solvents.

Figure 1:
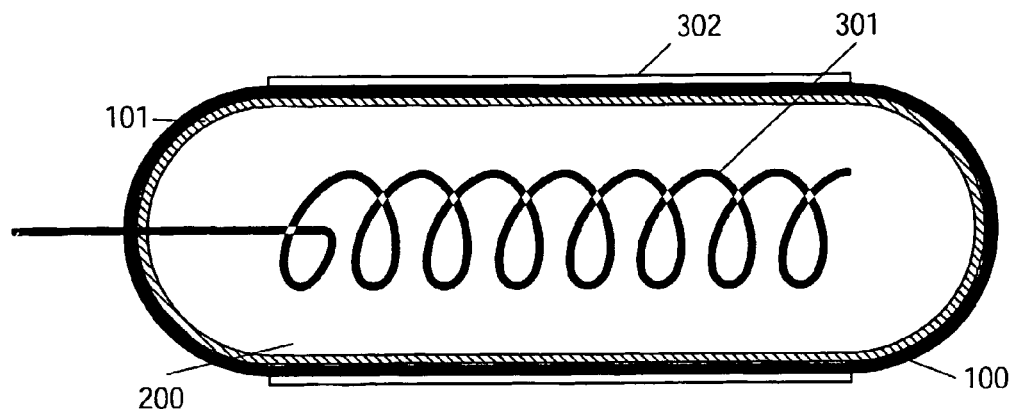
FIG. 1 shows a first design of device for generating ultraviolet radiation, having a concentric electrode.
Figure 2:
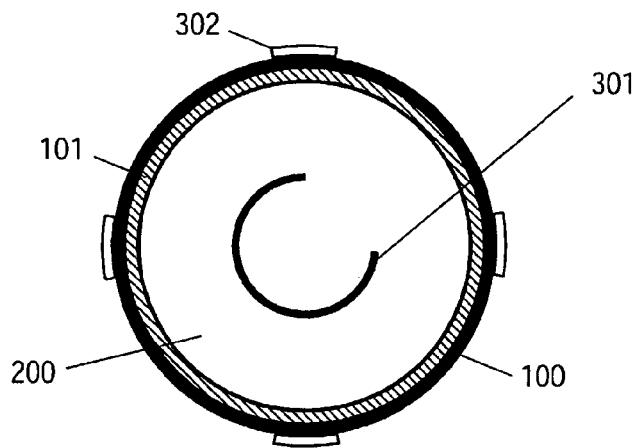
FIG. 2 shows a first design of device for generating ultraviolet radiation, having a concentric electrode, in cross-section.

In the case of the design shown in FIGS. 1 and 2, the medium to be treated may be conducted past the outside face of the radiant source. In a further application, this design may, for example, be used for the cleaning of surfaces in the dry state.

In the case of the design shown in FIGS. 3 and 4, the reacting medium may be conducted past the inner and/or outer face of the radiant source. To make it possible for irradiation to take place at the inner face, the electrode adjacent the axis of the lamp must be transparent or perforated. This design can be used to destroy solvent residues in water or air or other gases.

Figure 15:
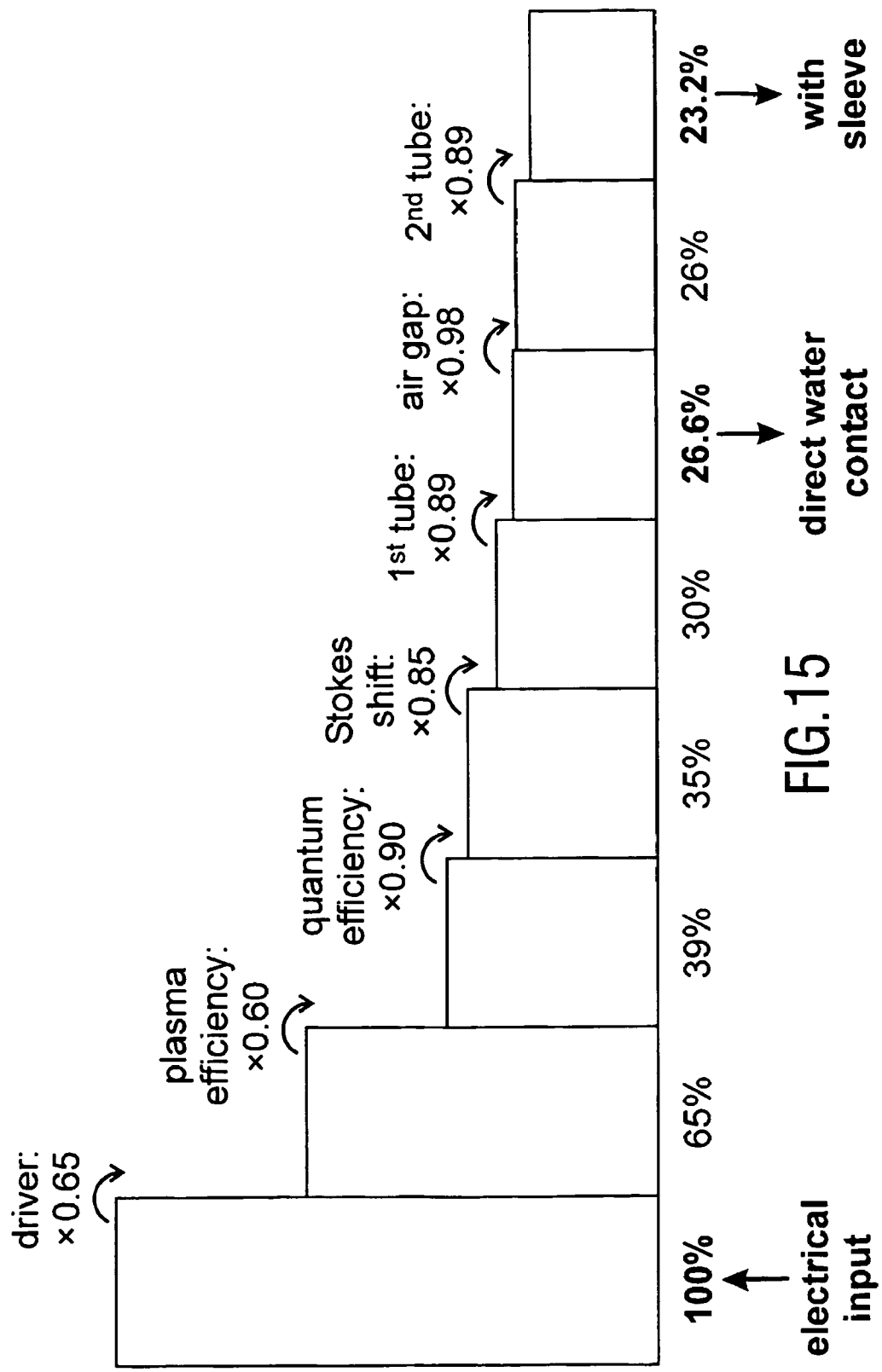
FIG. 15 is a chart showing an illustrative calculation of the efficiency with which UV fluorescent radiation of around 200 nm is generated from the primary radiation from an Xe-excimer discharge.

As shown in FIG. 15, an overall efficiency of 26.6% can be achieved for a driver efficiency of 65% a plasma efficiency for the xenon excimer discharge of 60%, a quantum conversion efficiency on the part of the phosphor of 90%, a Stokes shift of 85% and a transmission by the material of the gas discharge vessel of 89%. This is more than three times the efficiency of a mercury VUV lamp.

EMBODIMENT 1

A suspension of $LaPO_4$:Nd in butyl acetate with nitrocellulose as a binder is produced. The phosphor suspension is applied to the inner wall of a tube of synthetic quartz (Suprasil™) with an inside diameter of 5 mm by a flow coating process. The thickness of the phosphor layer corresponds to a weight per unit area for the phosphor of 3 mg/cm³. The binder is burnt off at a temperature below 580° C. The device is filled with xenon at a pressure of 200 to 300 mbar and then sealed. Any contamination by oxygen must be carefully avoided. Two electrodes of aluminum foil are bonded diagonally to the outer wall of the device.

The device is operated by a.c. current having a square-wave characteristic, an amplitude of 6 kV and a frequency of 25 kHz.

EMBODIMENT 2

The discharge vessel of the device in example of implementation 2 comprises a cylindrical tube of synthetic quartz (Suprasil™) measuring 0.7 mm in thickness and 50 mm in diameter. It is filled with xenon at a pressure of 200 mbar. An inner electrode of metal wire coiled in a spiral is arranged on the axis of the tube. Six strips of silver foil are bonded to the outer wall of the discharge vessel parallel to the inner electrode to form the outer electrode. The inner surface of the outer wall is coated with a layer of phosphor that contains $YPO_4$:Nd as a phosphor.

The device is operated by a.c. current having a square-wave characteristic, an amplitude of 6 kV and a frequency of 25 kHz.

EMBODIMENT 3

The discharge vessel of the device in example 3 comprises two co-axial tubes of synthetic quartz (Suprasil™) measuring 0.7 mm in thickness, and 50 mm in inside diameter and 40 mm in outside diameter respectively. The two tubes are so connected together at both ends as to form a gas-tight hollow sleeve. This is filled with xenon at a pressure of 200 mbar. The wall of the hollow sleeve adjacent the axis of the tubes is coated with a layer of aluminum that forms the first electrode and on the side remote from the axis of the tubes six strips of silver foil are bonded to the wall of the hollow sleeve remote from the axis of the tubes, parallel to the axis of the tubes, these strips forming the second electrode. The inner surfaces of the hollow sleeve are coated with a layer of phosphor that contains $LaPO_4$:Nd as a phosphor.

The device is operated by a.c. current having a square-wave characteristic, an amplitude of 6 kV and a frequency of 25 kHz.

The invention claimed is:

1. A device for generating ultraviolet radiation by means of an excimer discharge, which device is equipped with an at least partly UV-transparent discharge vessel whose discharge space is filled with a gas filling, with means for triggering and maintaining an excimer discharge in the discharge space, and with a coating that contains a phosphor comprising a host lattice and neodymium(III) as an activator, wherein the phosphor is selected from the group $(La_{1-x}Y_x)PO_4$:Nd where $0 \leq x \leq 1$, $(La_{1-x}Y_x)PO_4$:Nd,Pr where $0 \leq x \leq 1$, $SrAl_{12}O_{19}$:Nd, $LaB_3O_6$:Nd; $LaMgB_5O_{10}$:Nd, $SrAl_{12}O_{19}$:Nd,Pr, $LaBO_3O_6$:Nd,Pr, $LaMgB_5O_{10}$:Nd,Pr and $GdPO_4$:Nd.

2. The device for generating ultraviolet radiation as claimed in claim 1, wherein the phosphor contains praseodymium(III) as a co-activator.

3. The device for generating ultraviolet radiation as claimed in claim 1, wherein the phosphor comprises a coating that contains an oxide selected from the group MgO, $SiO_2$ and $Al_2O_3$.

4. The device for generating ultraviolet radiation as claimed in claim 1, wherein the gas filling contains a gas selected from the group xenon, krypton, argon, neon and helium.

5. The device for generating ultraviolet radiation as claimed in claim 1, wherein the gas filling contains xenon.

6. The device for generating ultraviolet radiation as claimed in claim 1, wherein the means for triggering and maintaining include electrodes that are composed of a metal or an alloy that reflects UV-C light.

7. The device for generating ultraviolet radiation as claimed in claim 1, wherein part of the discharge vessel is provided with a coating that acts as a reflector of VUV and/or UV-C light.

8. Use of the device claimed in claim 1 for photolytic processes.

9. A device for generating ultraviolet radiation comprising:
at least partly UV-transparent discharge vessel having a discharge space filled with a gas filling;
electrodes configured to trigger and maintain an excimer discharge in the discharge space; and
a coating that contains a phosphor comprising a host lattice and neodymium(III) as an activator, wherein the phosphor is selected from the group $(La_{1-x}Y_x)PO_4$:Nd where $0 \leq x \leq 1$, $(La_{1-x}Y_x)PO_4$:Nd,Pr where $0 \leq x \leq 1$, $SrAl_{12}O_{19}$:Nd, $LaB_3O_6$:Nd, $LaMgB_5O_{10}$:Nd, $SrAl_{12}O_{19}$:Nd,Pr, $LaBO_3O_6$:Nd,Pr, $LaMgB_5O_{10}$:Nd,Pr and $GdPO_4$:Nd.

10. The device of claim 9, wherein the phosphor contains praseodymium(III) as a co-activator.

11. The device of claim 9, wherein the phosphor comprises a coating that contains an oxide selected from the group MgO, $SiO_3$ and $Al_2O_3$.

12. The device of claim 9, wherein the gas filling includes a gas selected from the group xenon, krypton, argon, neon and helium.

13. The device of claim 9, wherein the gas filling includes xenon.

14. The device of claim 9, wherein the means for triggering and maintaining include electrodes that are composed of a metal or an alloy that reflects UV-C light.

15. The device of claim 9, wherein part of the discharge vessel is provided with a coating that acts as a reflector of VUV and/or UV-C light.

* * * * *